United States Patent
Kitayama (10) Patent No.: US 10,030,834 B2
(45) Date of Patent: Jul. 24, 2018

(54) LIGHT DEVICE FOR VEHICLE

(71) Applicant: HONDA MOTOR CO., LTD., Tokyo (JP)

(72) Inventor: Kyosuke Kitayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 149 days.

(21) Appl. No.: 14/638,376

(22) Filed: Mar. 4, 2015

(65) Prior Publication Data

US 2015/0260365 A1     Sep. 17, 2015

(30) Foreign Application Priority Data

Mar. 11, 2014   (JP) .................. 2014-047875

(51) Int. Cl.
*F21S 8/10*   (2006.01)
*F21V 21/00*  (2006.01)
(Continued)

(52) U.S. Cl.
CPC .......... *F21S 41/663* (2018.01); *B60Q 1/0058* (2013.01); *B60Q 1/38* (2013.01); *B62J 6/005* (2013.01); *B62J 6/04* (2013.01); *F21S 43/14* (2018.01); *F21S 43/19* (2018.01); *F21S 43/26* (2018.01); *F21S 43/30* (2018.01);
(Continued)

(58) Field of Classification Search
CPC .... F21S 48/1208; F21S 48/1747; F21S 48/23; F21S 48/2212; F21S 48/1311; F21S 48/232; F21S 48/234; F21S 48/211; F21S 48/215; F21S 41/663; F21S 43/19; F21S 43/37; F21S 43/30; F21S 43/26; F21S 43/14; F21S 43/31; B60Q 1/0058; B60Q 1/38; B62J 6/04; B62J 6/005; F21W 2101/10; F21W 2102/00; F21V 7/0008; F21Y 2115/10

See application file for complete search history.

(56) References Cited

U.S. PATENT DOCUMENTS 5,561,346 A * 10/1996 Byrne ............ F21K 9/13
                                          313/113
6,682,211 B2 * 1/2004 English ........... B60Q 1/2696
                                          257/E25.028

(Continued)

FOREIGN PATENT DOCUMENTS

JP    2007-035499    2/2007

*Primary Examiner* — Erin Kryukova (74) *Attorney, Agent, or Firm* — Rankin, Hill & Clark LLP (57) ABSTRACT

A light device for a vehicle improves viewability by giving variations to the appearance at the time of lighting without increasing the light quantity. The light device includes first light sources oriented to an irradiation direction of the light device, second light sources oriented opposite to the irradiation direction, a first base plate that mounts the first light sources and a second base plate that mounts the second light sources, and a lens that allows irradiation light of the first light sources and the second light sources to permeate therethrough. The base plates are disposed perpendicularly to the irradiation direction of the light device. A reflector reflects the irradiation light of the second light sources to the irradiation direction and an extension section surrounds the first light sources and stands so as to be oriented to the irradiation direction.

9 Claims, 8 Drawing Sheets

(51) Int. Cl.

| | | |
|---|---|---|
| *F21V 1/00* | (2006.01) | |
| *F21V 11/00* | (2015.01) | |
| *F21V 7/00* | (2006.01) | |
| *F21S 41/663* | (2018.01) | |
| *B60Q 1/38* | (2006.01) | |
| *B62J 6/00* | (2006.01) | |
| *B62J 6/04* | (2006.01) | |
| *B60Q 1/00* | (2006.01) | |
| *F21S 43/19* | (2018.01) | |
| *F21S 43/14* | (2018.01) | |
| *F21S 43/20* | (2018.01) | |
| *F21S 43/30* | (2018.01) | |
| *F21S 43/37* | (2018.01) | |
| *F21S 43/31* | (2018.01) | |
| *F21Y 115/10* | (2016.01) | |
| *F21W 102/00* | (2018.01) | |

(52) U.S. Cl.
CPC ............... *F21S 43/31* (2018.01); *F21S 43/37* (2018.01); *F21W 2102/00* (2018.01); *F21Y 2115/10* (2016.08)

(56) References Cited

U.S. PATENT DOCUMENTS

| | | | | |
|---|---|---|---|---|
| 2003/0174514 A1* | 9/2003 | Natsume | ............... | F21S 48/215 362/545 |
| 2004/0120157 A1* | 6/2004 | Bottesch | .............. | B60Q 1/0052 362/487 |
| 2004/0120160 A1* | 6/2004 | Natsume | .............. | B60Q 1/0058 362/544 |
| 2008/0049438 A1* | 2/2008 | Bloemen | .............. | B60Q 1/0052 362/540 |
| 2013/0114280 A1* | 5/2013 | Oh | ........................ | F21S 48/215 362/516 |

\* cited by examiner

LIGHT DEVICE FOR VEHICLE

BACKGROUND OF THE INVENTION

Field of the Invention

The present invention generally relates to a light device for a vehicle, and more specifically relates to a light device for a vehicle improving viewability by the way of leading the irradiation light of a light source.

Description of Related Art

A light device for a vehicle is known that improves viewability at the time of lighting by devising the way of leading the irradiation light of a light source.

In JP-A No. 2007-035499, a configuration is disclosed in which, in a head light that is a light device having the light source of LEDs (light emitting diode), LEDs having the vertical upward irradiation direction and LEDs having the vertical downward irradiation direction are provided on the rear side of LEDs having the irradiation direction of the vehicle body forward direction, the irradiation light of these LEDs are reflected to the vehicle body forward direction by reflectors, and thereby the light quantity of the irradiation is increased without increasing the number of LED viewed from the outside.

However, the technology described in JP-A No. 2007-035499 is for improving viewability by increasing the irradiation light to the vehicle body front direction, and the devisal for improving viewability without increasing the light quantity itself has not been studied.

SUMMARY OF THE INVENTION

The present invention is directed toward providing a light device that addresses the problems of the above related art and improves viewability by giving variations to the appearance at the time of lighting without increasing the light quantity.

In accordance with the present invention, a light device for a vehicle includes first light sources oriented to an irradiation direction of the light device for a vehicle; second light sources directed opposite to the irradiation direction; a base plate of a tabular shape that mounts the first light sources and the second light sources; and a lens that allows irradiation light of the first light sources and irradiation light of the second light sources to permeate therethrough, in which the base plate is disposed perpendicularly to the irradiation direction of the light device for a vehicle. The light device is further includes a reflector that reflects the irradiation light of the second light sources to the irradiation direction; and an extension section that surrounds the first light sources and stands so as to be oriented to the irradiation direction.

Because the base plate is disposed perpendicularly to the irradiation direction of the light device for a vehicle and the reflector that reflects the irradiation light of the second light sources to the irradiation direction and the extension section that surrounds the first light sources and stands so as to be oriented to the irradiation direction are provided, when the light device is lit, the irradiation light of the first light sources is kept inside the profile formed by the extension section and the irradiation light of the second light sources is emitted outside the profile formed by the extension section, and therefore the inside and the outside of the extension section come to be viewed so as to be separated from each other. In other words, such a visual effect can be secured that, in the front view of the light device, the extension section comes to appear so as to emphasize the profile thereof within the irradiation range of the light device. Thus, viewability of the light device for a vehicle can be improved with a simple structure without increasing the light quantity itself. Also, reduction of the light quantity of the light emission section by the first light sources can be prevented by preventing the irradiation light of the first light sources from leaking sideways by the extension section.

In further accordance with the present invention, the extension section extends to a position adjacent to the rear surface of the lens. Because the extension section extends to a position adjacent to the rear surface of the lens, separation by the profile formed by the extension section is emphasized, and viewability of the light device for a vehicle can be improved further.

In further accordance with the present invention, the extension section is arranged in the base plate that mounts the first light sources. Because the extension section is arranged in the base plate that mounts the first light sources, the extension section surrounding the first light sources can be formed easily by bending the end of the base plate toward the irradiation direction.

In further accordance with the present invention, the base plates include a first base plate that mounts the first light sources and a second base plate that mounts the second light sources, and a second extension section that surrounds the second light sources and stands in the opposite direction of the extension section is arranged in the second base plate. Therefore, the irradiation light of the second light sources can be prevented from leaking sideways, and reduction of the light quantity reflected by the reflector toward the irradiation section can be prevented. Thus, the inside and outside of the extension section can emit the light with uniform light quantity.

In further accordance with the present invention, the second extension section and an outer periphery section of the reflector are configured to overlap with each other in the irradiation direction. Because the second extension section and the outer periphery section of the reflector are configured to overlap with each other in the irradiation direction, the dimension in the irradiation direction of the light device can be made small, and the light device can be made compact.

In further accordance with the present invention, a recess that corresponds to the inside of the extension section is formed in the lens by increasing the thickness of a periphery section that corresponds to the outside of the extension section. Because the recess that corresponds to the inside of the extension section is formed in the lens by increasing the thickness of the periphery section that corresponds to the outside of the extension section, the difference in viewability between the inside and outside of the extension section can be enlarged further.

In further accordance with the present invention, an outer lens that covers the lens is arranged at a position on the irradiation direction side of the lens. Because the outer lens that covers the lens is arranged at a position on the irradiation direction side of the lens, without generating unevenness in the outer lens that constitutes the profile of the light device, only the visual effect by arranging the recess in the lens on the inner side thereof can be secured.

In further accordance with the present invention, the reflector extends to the vicinity of the side of the second light sources on the irradiation direction side of the light device for a vehicle. Because the reflector extends to the vicinity of the side of the second light sources on the irradiation direction side of the light device for a vehicle, even when an extension section is not arranged in the side of the second light sources, the irradiation light thereof can be reflected toward the irradiation direction by the reflector without leaking sideways.

In further accordance with the present invention, the extension section is formed into a cylindrical shape, and the end thereof is configured to abut on the rear surface of the lens. Because the extension section is formed into a cylindrical shape and the end thereof is configured to abut on the rear surface of the lens, manufacturing of the extension section becomes easy, a ring-like profile comes to be viewed so as to be emphasized at the time of lighting the light device, and high visual effect can be secured. Also, reduction of the light quantity of the light emission surface can be prevented by preventing the irradiation light by the first light sources from leaking sideways.

DETAILED DESCRIPTION OF THE INVENTION

Figure 1:
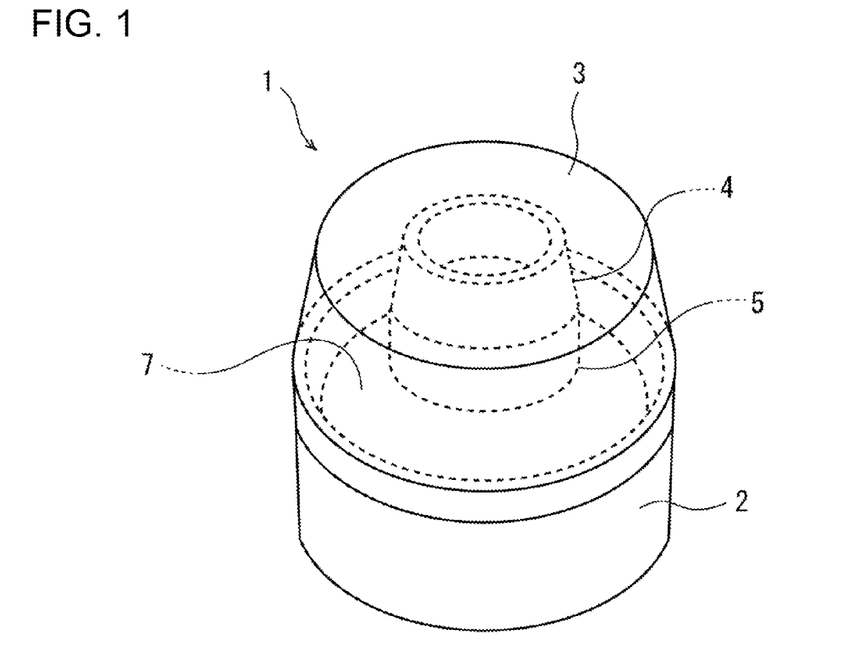
FIG. 1 is a perspective view of the light device for a vehicle in relation with an embodiment of the present invention.
Figure 2:
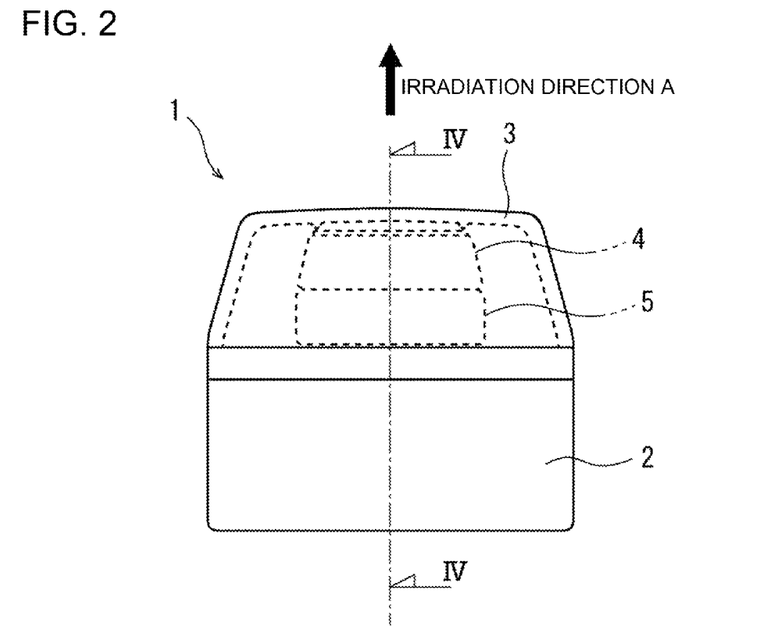
FIG. 2 is a plan view of the light device.
Figure 3:
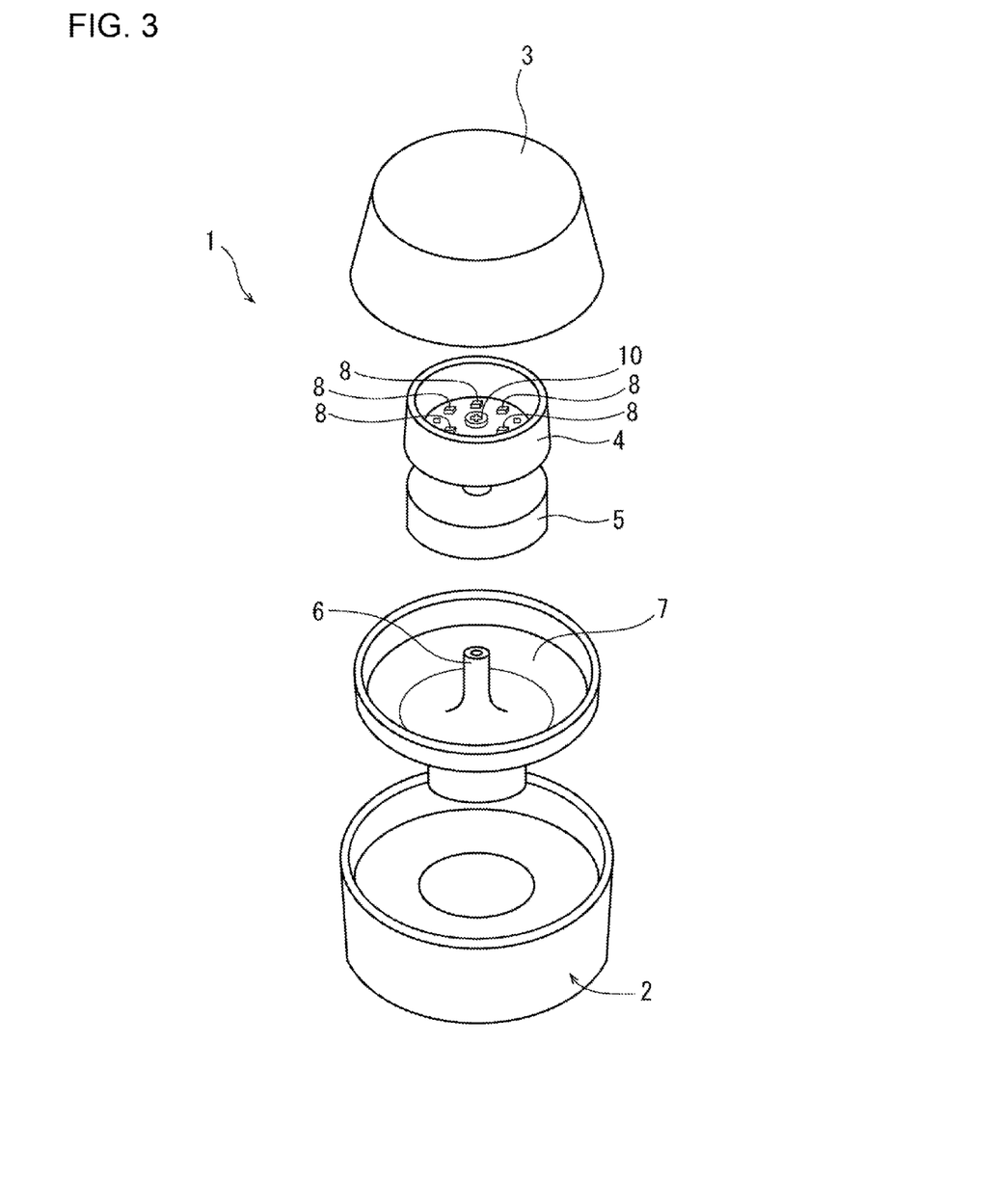
FIG. 3 is an exploded perspective view of the light device.

Below, preferred embodiments of the present invention will be described in detail referring to the drawings. FIG. 1 is a perspective view of a light device 1 for a vehicle (hereinafter shown merely as a light device) in relation with an embodiment of the present invention. FIG. 2 is a plan view of the light device 1, and FIG. 3 is an exploded perspective view of the light device 1.

The light device 1 has the light source of an LED (light emitting diode), and is a light device applied as a blinker device for a motorcycle, for example. The light device 1 has a configuration of accommodating base plates 4, 5 that mount the light sources and a reflector 7 in a space formed between a housing 2 and a lens 3. The housing 2 is formed of a black resin and the like, and the lens 3 is formed of a colorless transparent or colored transparent resin. The reflector 7 that engages the inside of the housing 2 is formed of a resin and the like, and a reflecting surface by plating, metal vapor deposition and the like is arranged thereon.

Figure 4:
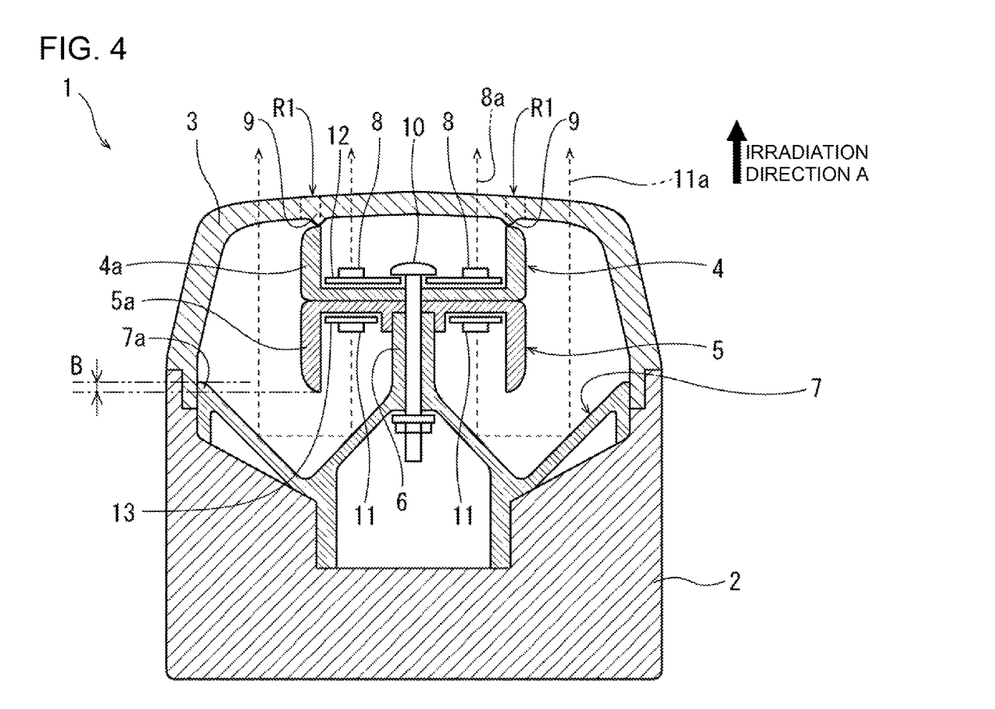
FIG. 4 is a cross-sectional view taken from line IV-IV of FIG. 2.

In the light device 1 in relation with the present embodiment, the base plate mounting the light sources is formed of the first base plate 4 that mounts the first light sources 8 and the second base plate 5 that mounts the second light sources 11 (refer to FIG. 4). Both of the first base plate 4 and the second base plate 5 are formed into a bottomed cylindrical shape, and are fixed to a support column 6 arranged in the reflector 7 using a fastening member 10, such as a screw, with the bottom surfaces thereof abutting on each other back to back. Thus, the bottom sections of the first base plate 4 and the second base plate 5 are fixed so as to be oriented to the direction perpendicular to the irradiation direction A of the light device 1.

The first light sources 8 and the second light sources 11 are mounted on the bottom sections of the first base plate 4 and the second base plate 5. Therefore, the light axis of the first light sources 8 comes to be oriented to the same direction as the irradiation direction A, and the light axis of the second light sources 11 comes to be oriented in a direction opposite to the irradiation direction A.

Figure 5:
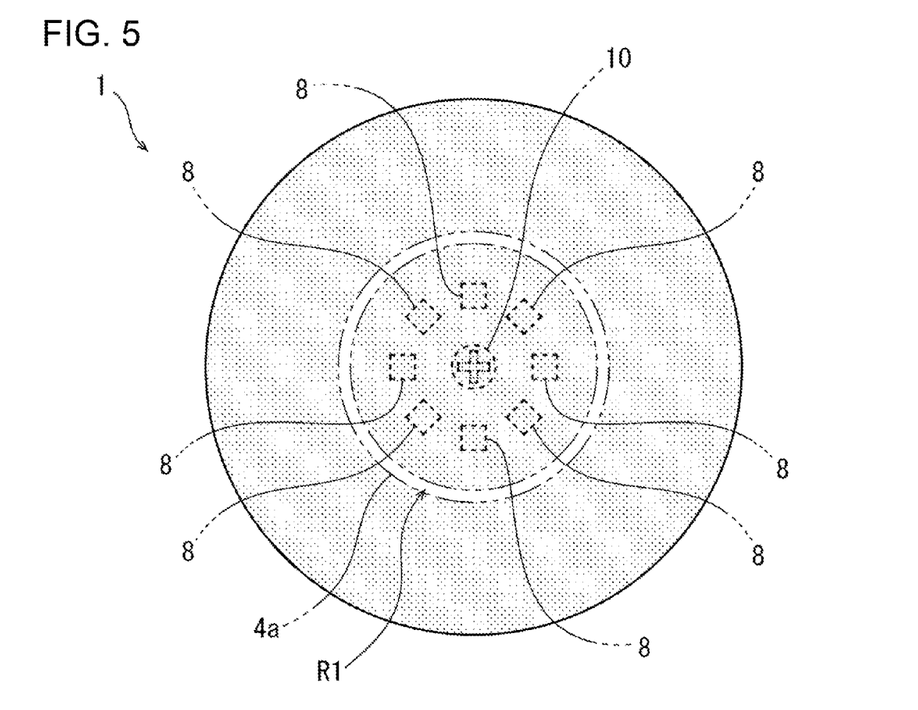
FIG. 5 is a front view of the light device.

FIG. 4 is a cross-sectional view taken from line IV-IV of FIG. 2. Also, FIG. 5 is a front view of the light device 1. The first base plate 4 mounts the first light sources 8 of eight pieces in total at equal intervals in a ring shape in a copper foil section 12 arranged on the bottom section of the bottomed cylindrical shape thereof. An extension section 4a corresponding to the side face of the bottomed cylindrical shape stands toward the irradiation direction A side so as to surround the first light sources 8 by bending the end of the first base plate 4.

The extension section 4a is extended to a position adjacent to the rear surface side of the lens 3, a projection section 9 of a ring shape abutting on the extension section 4a is formed on the rear surface side of the lens 3, and therefore the extension section 4a abuts on the rear surface side of the lens 3. Thus, irradiation light 8a of the first light sources 8 is prevented from leaking sideways, and reduction of the light quantity of the light emitting section by the first light sources 8 can be prevented.

With the configuration described above, when the light device 1 is lit, as shown in the front view of FIG. 5, a portion where the extension section 4a exists comes to appear clearly as a profile R1 of a ring shape. In other words, the light emitting section by the first light sources 8 and the light emitting section by the second light sources 11 are separated from each other clearly by arranging the extension section 4a. Thus, a peculiar visual effect is given by a simple structure and viewability of the light device 1 is improved without increasing the light quantity itself.

Also, in the present embodiment, the second base plate 5 is also formed into a bottomed cylindrical shape having a diameter equal to that of the first base plate 4, and the second light sources 11 of eight pieces in total are mounted at equal intervals in a ring shape in a copper foil section 13 arranged on the bottom section thereof. A second extension section 5a corresponding to the side face of the bottomed cylindrical shape stands toward the opposite side of the irradiation direction A so as to surround the second light sources 11 by bending the end of the second base plate 5. Thus, irradiation light 11a of the second light sources 11 comes to be reflected to the irradiation direction A side by the reflector 7 without leaking sideways, and generation of the difference between the light quantity of the irradiation light 11a and the irradiation light 8a can be prevented. Also, by being formed of a resin that hardly reflects the irradiation light and being coated with low reflectance ratio on the surface, the extension sections 4a, 5a can prevent reflection to the side and can improve directivity to the irradiation direction A.

Further, the edge on the outside in the radial direction of the reflector 7 may be formed into a shape same to that of the outer peripheral part of the housing 2 as shown in FIGS. 1-3, and may be configured to be stored in the inside of the joint of the housing 2 and the lens 3 as shown in FIG. 4. In the example shown in FIG. 4, an offset amount B is arranged between the front ends of an outer edge 7a of the reflector 7 and the second extension section 5a, which means that the front ends of the outer edge 7a of the reflector 7 and the second extension section 5a are configured to overlap with each other in the irradiation direction A, thereby the dimension in the irradiation direction A of the light device 1 is made small, and the light device 1 is made compact.

Although the light device 1 has a feature that the profile R1 clearly appears by lighting both of the first light sources 8 and the second light sources 11, it is also possible to light either one of the first light sources 8 or the second light sources 11. Therefore, an operation of blinkering the ring section by the second light sources 11 while the small circle section by the first light sources 8 emits the light and so on is possible. In this case also, because the small circle section and the ring section are clearly separated from each other in emitting the light, high viewability can be secured.

Figure 6:
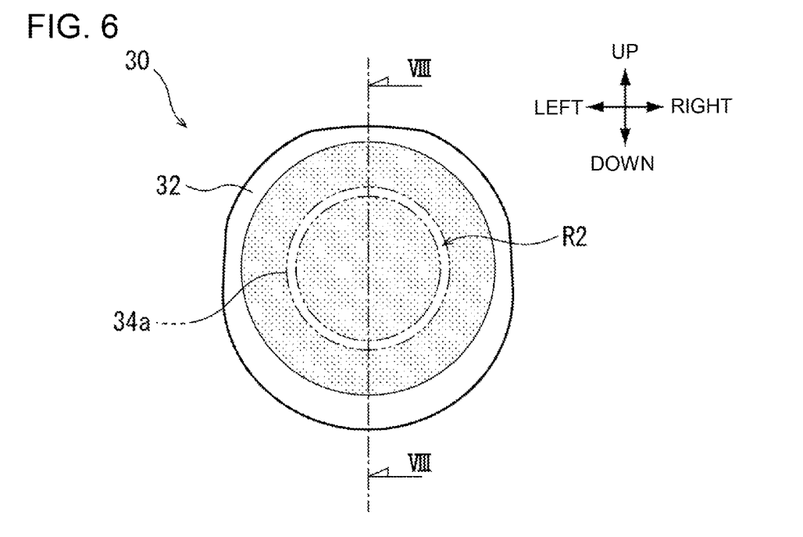
FIG. 6 is a front view of the light device for a vehicle in relation with the second embodiment of the present invention.
Figure 7:
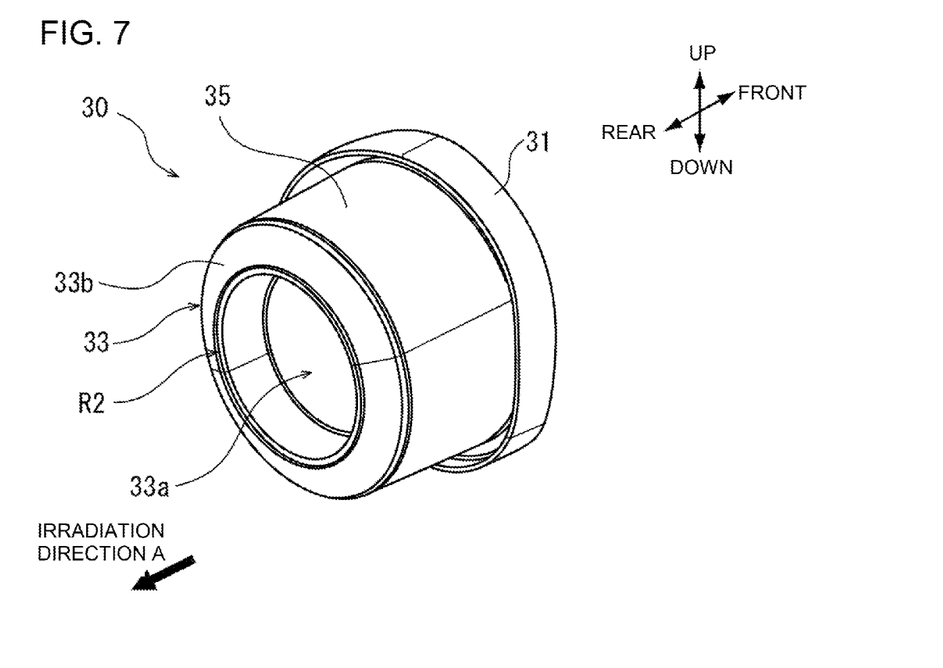
FIG. 7 is a perspective view of the light device.
Figure 8:
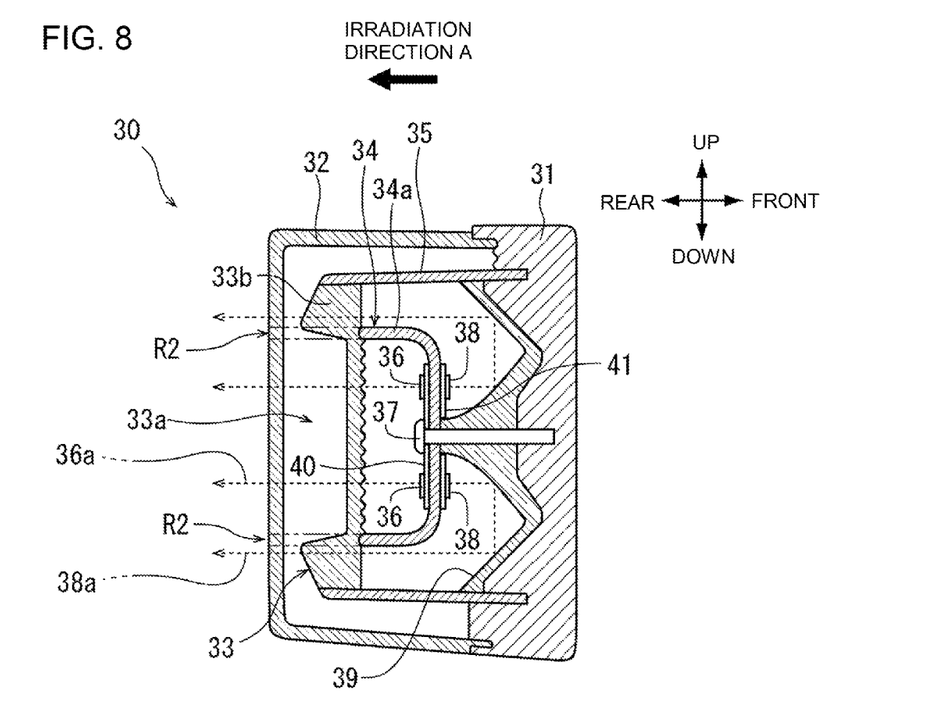
FIG. 8 is a cross-sectional view taken from line VIII-VIII of FIG. 6.

FIG. 6 is a front view of a light device 30 for a vehicle (hereinafter referred to merely as a light device) in relation with the second embodiment of the present invention. Also, FIG. 7 is a perspective view of the light device 30, and FIG. 8 is a cross-sectional view taken from line VIII-VIII of FIG. 6.

The light device 30 applied to a tail light device of a motorcycle is configured to accommodate a base plate 34 that mounts the light sources and a reflector 39 in a space formed between a housing 31 and a lens 33. The housing 31 is formed of a black resin and the like, and the lens 33 is formed of a colorless transparent or colored transparent resin. In the present embodiment, a colorless transparent or colored transparent outer lens 32 is arranged outside the lens 33. Also, the reflector 39 that engages with the inside of the housing 31 is formed of a resin and the like, and a reflecting surface by plating, metal vapor deposition and the like is arranged thereon.

In the light device 30, first light sources 36 and second light sources 38 are mounted on the front and rear surfaces of the single base plate 34, respectively. The base plate 34 formed into a bottomed cylindrical shape is fastened along with the reflector 39 to the housing 31 using a fastening member 37, such as a screw. Thus, the bottom section of the base plate 34 is fixed so as to be oriented to the direction perpendicular to the irradiation direction A of the light device 30.

The first light sources 36 and the second light sources 38 are mounted on the front and rear surfaces of the base plate 34. Therefore, the light axis of the first light sources 36 comes to be oriented to the direction same to the irradiation direction A, and the light axis of the second light sources 38 comes to be oriented to the direction opposite to the irradiation direction A.

The base plate 34 mounts at least two pieces of the first light sources 36 at equal intervals in a ring shape in a copper foil section 40 arranged on the bottom section of the bottomed cylindrical shape thereof. An extension section 34a corresponding to the side face of the bottomed cylindrical shape stands toward the irradiation direction A side so as to surround the first light sources 36 by bending the end of the base plate 34.

The extension section 34a is extended to a position abutting on the rear surface side of the lens 33. Thus, irradiation light 36a of the first light sources 36 is prevented from leaking sideways, and reduction of the light quantity of the light emitting section by the first light sources 36 can be prevented.

The base plate 34 mounts at least two pieces of the second light sources 38 in a similar copper foil section 41 arranged on the rear surface thereof. Also, in the present embodiment, the edge of the reflector 39 is extended toward the irradiation direction A side, and extends to a position adjacent to the side of the second light sources 38. Thus, irradiation light 38a of the second light sources 38 is reflected to the irradiation direction A side by the reflector 39 without leaking sideways. Also, the lens 33 is supported by a cylindrical cover 35 that is fixed to the housing 31 side. This cylindrical cover 35 is formed of a resin colored in an optional color and so on, and has a function of preventing the base plate 34 and the like from being viewed from the outside in addition to preventing the irradiation light 38a of the second light sources 38 from leaking sideways.

With the configuration described above, when the light device 30 is lit, as shown in the front view of FIG. 6, a portion where the extension section 34a exists comes to appear clearly as a profile R2 of a ring shape. In other words, the light emitting section by the first light sources 36 and the light emitting section by the second light sources 38 are separated from each other clearly by arranging the extension section 34a. Thus, a peculiar visual effect is given by a simple structure and viewability of the light device 30 is improved without increasing the light quantity itself.

Also, in the present embodiment, by increasing the thickness of an edge 33b of the lens 33 corresponding to the outside of the extension section 34a, a recess 33a of a cylindrical shape is formed inside the extension section 34a. Thus, the difference in viewability between the inside and outside of the extension section 34a is enlarged further. Also, a wave-like lens cut is arranged on the rear surface side of the recess 33a, and variation in the appearance is further given to the light emitting section inside the extension section 34a.

In the present embodiment, the unevenness is not arranged in the outer lens 32 outside the lens 33, and it is configured to obtain only the visual effect by arranging the recess 33a without giving variation in the smooth profile of the light device 30.

As described above, according to the light device for a vehicle in relation with the present invention, because the base plate supporting the LED light sources is disposed perpendicularly to the irradiation direction of the light device and the extension section surrounding the first light sources and standing so as to be oriented to the irradiation section is arranged, the irradiation light of the first light sources is kept inside the profile formed by the extension section and the irradiation light of the second light sources is emitted outside the profile formed by the extension section, and therefore such visual effect can be secured that the inside and outside of the extension section are viewed separately and the profile of the extension section appears so as to be emphasized within the irradiation range of the light device. Thus, viewability of the light device for a vehicle can be improved by a simple structure without increasing the light quantity itself.

Also, the shape and structure of the light device for a vehicle, the use and lighting method of the light device, the shape and structure of the base plate and the extension section, the form, disposal position and number of pieces of the light source, the shape of the lens and the housing, and so on are not limited to the embodiments described above, and various alterations are possible. For example, the extension section of the base plate can be configured so as to be integral with or separate from the bottom section of the base plate, and can be formed into a polygonal shape or an optional shape in the front view of the light device. The light device for a vehicle in relation with the present invention can be applied to various light devices such as a head light, tail light device, position light and the like in addition to the blinker device.

REFERENCE SIGN LIST

1, 30 . . . Light device for a vehicle (light device)
2, 31 . . . Housing 3, 33 . . . Lens
4 . . . First base plate (base plate)
5 . . . Second base plate (base plate)
34 . . . Base plate
7, 39 . . . Reflector
8, 36 . . . First light sources
11, 38 . . . Second light sources
4a, 34a . . . Extension section
5a . . . Second extension section
8a, 36a . . . Irradiation light of first light sources
11a, 38a . . . Irradiation light of second light sources
33a . . . Recess
33b . . . Edge
A . . . Irradiation direction
R1, R2 . . . Profile

What is claimed is:

1. A light device for a vehicle, comprising:
    first light sources oriented to an irradiation direction of the light device for a vehicle;
    second light sources directed to an opposite direction of the irradiation direction;
    a first base plate that mounts at least one of the first light sources and the second light sources; and
    a lens that allows irradiation light of the first light sources and irradiation light of the second light sources to permeate therethrough, wherein
    the first base plate is disposed perpendicularly to the irradiation direction of the light device for a vehicle, and
    wherein the light device further comprises:
    a housing formed of an opaque material, the lens mounted to the housing and the first base plate is accommodated in a space formed between the lens and the housing;
    a reflector engaged to an inside of the housing and mounted to the first base plate, an outer periphery section of the reflector is extended toward the irradiation direction with the reflector outer edge from the first light sources in the opposite direction of the irradiation direction toward a base of the housing, the reflector reflects the irradiation light of the second light sources to the irradiation direction; and
    wherein an end of the first base plate is bent to define a first extension section integral with the first base plate that surrounds the first light sources and stands so as to be oriented to the irradiation direction thereby preventing the irradiation light of the first light sources from leaking sideways, further including a second base plate separate from and mounted to the first base plate that mounts the second light sources; and wherein an end of the second base plate is bent to define a second extension section integral with the second base plate that surrounds the second light sources and stands in an opposite direction of the first extension section thereby preventing the irradiation light of the second light sources from leaking sideways.

2. The light device for a vehicle according to claim 1, wherein the first extension section extends to a position adjacent to a rear surface of the lens.

3. The light device for a vehicle according to claim 1, wherein the second extension section and the outer periphery section of the reflector are configured to overlap with each other in the irradiation direction.

4. The light device for a vehicle according to claim 1, wherein a recess that corresponds to an inside of the first extension section is formed in the lens by increasing a thickness of a periphery section that corresponds to an outside of the first extension section.

5. The light device for a vehicle according to claim 4, wherein an outer lens that covers the lens is arranged at a position on the irradiation direction side of the lens.

6. The light device for a vehicle according to claim 4, wherein the outer edge of the reflector extends to a position adjacent a side of the second light sources toward the irradiation direction side of the light device for a vehicle.

7. The light device for a vehicle according to claim 1, wherein the first extension section is formed into a cylindrical shape, and an end thereof is configured to abut on a rear surface of the lens.

8. The light device for a vehicle according to claim 2, wherein a recess that corresponds to an inside of the first extension section is formed in the lens by increasing a thickness of a periphery section that corresponds to an outside of the first extension section.

9. The light device for a vehicle according to claim 8, wherein an outer lens that covers the lens is arranged at a position on the irradiation direction side of the lens.

* * * * *